US009258424B2

(12) United States Patent
Talapady et al.

(10) Patent No.: US 9,258,424 B2
(45) Date of Patent: Feb. 9, 2016

(54) PRIORITIZE CONTACT NUMBERS OF CUSTOMERS IN REAL TIME

(71) Applicant: Avaya Inc., Basking Ridge, NJ (US)

(72) Inventors: Shailesh Talapady, Pune (IN); Vivek Bawge, Pune (IN)

(73) Assignee: Avaya Inc., Basking Ridge, NJ (US)

(*) Notice: Subject to any disclaimer, the term of this patent is extended or adjusted under 35 U.S.C. 154(b) by 0 days.

(21) Appl. No.: 13/902,509

(22) Filed: May 24, 2013

(65) Prior Publication Data

US 2014/0348318 A1    Nov. 27, 2014

(51) Int. Cl.
*H04M 3/51* (2006.01)
*G06Q 10/10* (2012.01)
*G06Q 30/00* (2012.01)
*H04M 3/432* (2006.01)

(52) U.S. Cl.
CPC ............ *H04M 3/5191* (2013.01); *G06Q 10/10* (2013.01); *G06Q 30/01* (2013.01); *H04M 3/5158* (2013.01); *H04M 3/432* (2013.01); *H04M 2203/2072* (2013.01); *H04M 2203/402* (2013.01)

(58) Field of Classification Search
CPC ............ H04M 3/5158; H04M 3/5183; H04M 3/5191; H04M 3/432; H04M 2203/2072; H04M 2203/402; G06Q 10/10; G06Q 30/01

USPC ............... 379/266.07, 266.08, 265.09
See application file for complete search history.

(56) References Cited

U.S. PATENT DOCUMENTS

| | | | |
|---|---|---|---|
| 4,599,493 | A | 7/1986 | Cave |
| 4,829,563 | A | 5/1989 | Crockett et al. |
| 4,881,261 | A | 11/1989 | Oliphant et al. |
| 4,933,964 | A | 6/1990 | Girgis |
| 5,179,589 | A | 1/1993 | Syu |
| 5,436,965 | A | 7/1995 | Grossman et al. |
| 5,621,790 | A | 4/1997 | Grossman et al. |
| 5,963,635 | A * | 10/1999 | Szlam et al. ............... 379/309 |
| 8,634,543 | B2 | 1/2014 | Flockhart et al. |
| 2010/0235218 | A1 | 9/2010 | Erhart et al. |
| 2010/0296417 | A1 | 11/2010 | Steiner |
| 2011/0125793 | A1 | 5/2011 | Erhart et al. |
| 2011/0125826 | A1 | 5/2011 | Erhart et al. |

* cited by examiner

*Primary Examiner* — Harry S Hong
(74) *Attorney, Agent, or Firm* — Sheridan Ross P.C.

(57) ABSTRACT

A microprocessor executable contact manager operable to determine, for selected different types of customer communication devices, a likelihood of contacting successfully a customer at a respective type of customer communication device and select, based on the likelihood, an order and/or sequence in which to contact customer communication devices of the different customer communication device types.

21 Claims, 7 Drawing Sheets

Figures 3, 4A, 4B:
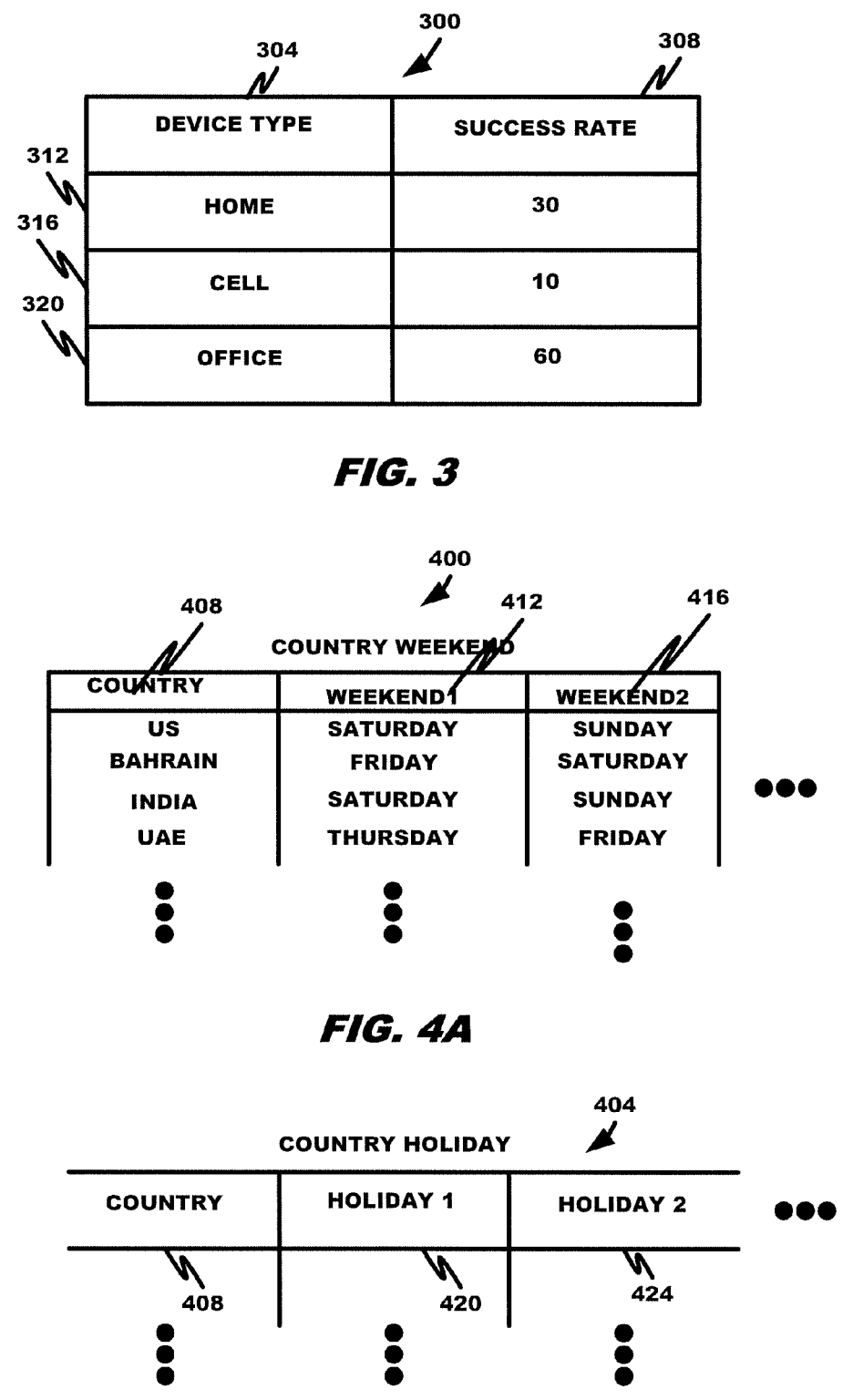

300

| DEVICE TYPE (304) | SUCCESS RATE (308) |
|---|---|
| HOME | 30 |
| CELL | 10 |
| OFFICE | 60 |

COUNTRY WEEKEND

| COUNTRY (408) | WEEKEND1 (412) | WEEKEND2 (416) | |
|---|---|---|---|
| US | SATURDAY | SUNDAY | ••• |
| BAHRAIN | FRIDAY | SATURDAY | |
| INDIA | SATURDAY | SUNDAY | |
| UAE | THURSDAY | FRIDAY | |

COUNTRY HOLIDAY

| COUNTRY (408) | HOLIDAY 1 (420) | HOLIDAY 2 (424) | ••• |
|---|---|---|---|

| Country | Day | Business Hours | |
| --- | --- | --- | --- |
| | | Business Hour Start | Business Hour End |
| India | Weekday | 9:30 | 18:30 |
| India | Weekend 1 | 9:30 | 12:30 |
| India | Weekend 2 | NULL | NULL |

| Country | Device Name | Special Days | Holidays | Weekend 1 | Weekend 2 | Weekdays Business hours | Weekdays Non Business hours |
| --- | --- | --- | --- | --- | --- | --- | --- |
| US | Cell | 10 | 10 | 7 | 7 | 5 | 9 |
| US | Home | 8 | 7 | 8 | 7 | 3 | 7 |
| US | Office | 3 | 2 | 2 | 2 | 10 | 2 |

Weightage

408 / 304 / 604 / 608 / 412 / 416 / 612 / 616

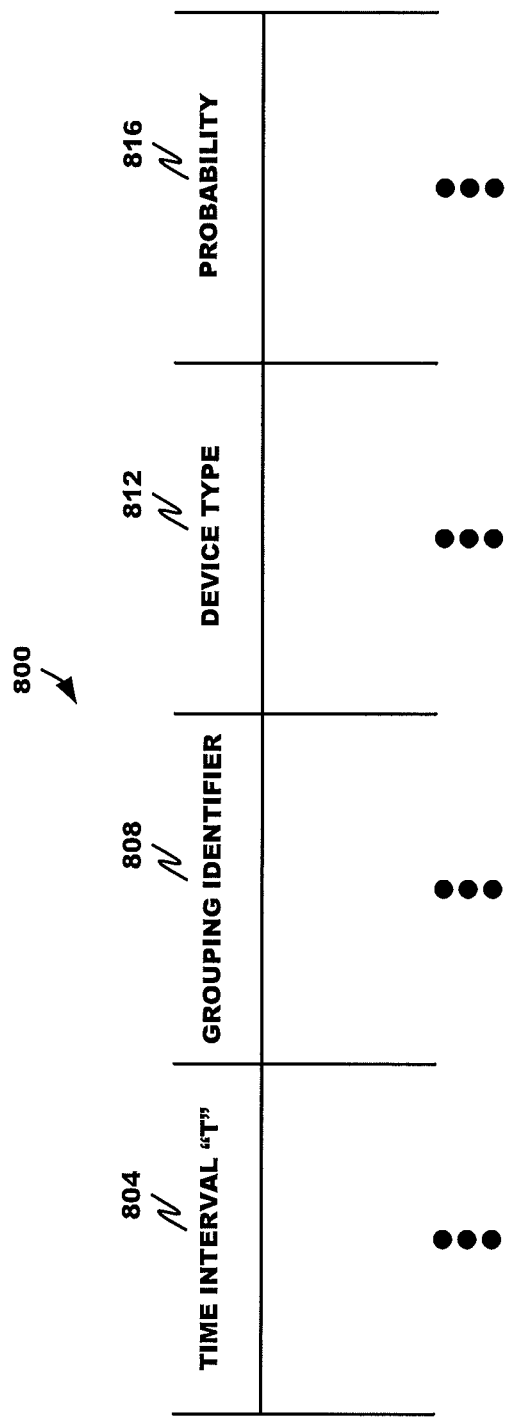

PRIORITIZE CONTACT NUMBERS OF CUSTOMERS IN REAL TIME

FIELD

The present disclosure is generally directed toward communications and more specifically toward contact centers.

BACKGROUND

A contact center manages all client contacts of a business or other entity through a variety of mediums, such as telephone, fax, letter, e-mail and, increasingly, online live chat. Distinct from call centers, that purely handle telephone correspondence, contact centers have a variety of roles that combine to provide an all encompassing solution to client and customer contact. Contact centers have many different configurations.

Contact centers can include automated dialer to effect outbound contacts to customers for a variety of different reasons, such as emergency notifications, debt collection, telemarketing and the like. Automated dialers enable a contact center to contact as many customers as possible in a limited time period. In current dialing solutions where there are multiple ways to contact a customer, such as home phone, office phone, mobile or cellular phone, pager, and the like, phone numbers can organized by device type (e.g., home phone, office phone, mobile or cellular phone, pager, and the like) so that a first device type is attempted first, a second device type second, and so on. However, this organization is in the discretion of a supervisor and might be required to be changed frequently based on changing circumstances. Also, there is no way to account for the day of the week or special days, such as holidays. Once set by the supervisor, the dialer attempts will be made to reach the customer in the same set order (e.g., if set first for office phone, second for home phone, and third for cellular phone) regardless of the day of the week, time of day, or applicable holiday (if any). In other words, it will use the set order until the dialer gets a response irrespective of whether the current day is a national holiday, weekend day, or business day. When the day of the week is a weekend or a national holiday, for example, the most likely number to try would be either the home or cellular phone numbers followed by the office number. Following the set order would therefore cause the dialer to waste precious time by making unanswered calls to the office phone number first. As a typical automatic dialer makes thousands of calls each day, the wasted time can be substantial.

SUMMARY

These and other needs are addressed by the various aspects, embodiments, and/or configurations of the present disclosure. The present disclosure is directed to an automated dialer in a contact center that can intelligently prioritize the device type to be called based on one or more selected factors.

The present disclosure can include a system, such as a contact center, including a microprocessor executable contact manager operable to:

determine, for selected different types of customer communication devices, a likelihood of contacting successfully a customer at a respective type of customer communication device; and select, based on the likelihood, an order and/or sequence in which to contact customer communication devices of the different customer communication device types.

The present disclosure can include a method including the steps:

determining, by a microprocessor executable contact manager and for a selected type of customer communication device, one or more of a success rate for contacting a customer at the selected type of customer communication device and a probability of contacting successfully the customer at the selected type of customer communication device; and selecting, by the microprocessor executable contact manager and based on one or more of the determined success rate for contacting a customer at the selected type of customer communication device and probability of contacting successfully the customer at the selected type of customer communication device, an order in which to contact customer communication devices of different device types including the selected type of customer communication device.

The present disclosure can include a computer readable medium comprising microprocessor executable instructions that, when executed, perform the steps:

determining, for selected different types of customer communication devices, a likelihood of contacting successfully a customer at a respective type of customer communication device; and selecting, based on the likelihood, an order and/or sequence in which to contact customer communication devices of the different customer communication device types.

A dialer can place the contacts to customer communication devices of the different customer communication device types based on the selected order and/or sequence.

The likelihood for a selected customer communication device type can be one or more of a success rate for contacting a customer at a selected type of customer communication device and probability of contacting successfully the customer at the selected type of customer communication device. The likelihood can be measured by other suitable algorithms as will be appreciated by those of ordinary skill in the art based on this disclosure.

The Success Rate can be Defined by:

S (device type)=C (device type)/D (device type), where S is the success rate for a selected device type, C is a number of successful connects for the selected device type, and D is a total number of attempted connects for the selected device type. The success rate can be measured by other suitable algorithms as will be appreciated by those of ordinary skill in the art based on this disclosure.

The probability of contacting successfully the customer at the selected type of customer communication device can be defined by:

P (device type)=S (device type)*W (device type), where P (device type) is a probability of contacting a customer at a selected customer communication device, S is the success rate for contacting the selected type of customer communication device, and W is a weighting factor for the selected device type. The probability can be measured by other suitable algorithms as will be appreciated by those of ordinary skill in the art based on this disclosure.

The weighting factor can be a function of one or more of whether a current time corresponds to a weekend, whether the current time corresponds to a holiday, whether the current time corresponds to a business day, whether the current time corresponds to a business hour of a business day, and a grouping identifier corresponding to a grouping of customers and/or customer communication devices and associated with the selected device type and/or customer communication device.

The order and/or sequence can be based on the relative magnitudes of the one or more of the determined success rate for contacting the selected type of customer communication device and probability of contacting successfully the selected type of customer communication device.

The different customer communication device types can correspond to a common grouping of customers and/or customer communication devices. The common grouping can correspond to one or more of a geopolitical and geocultural geographical area.

The different customer communication device types can be two or more of a home telephone, business telephone, cellular telephone, and pager.

As an example, a contact center as described herein can automatically change an attempt order of a selected type of communication device within a record of a customer based on one or more of a database containing work or business time, weekend days, and holiday schedules for different countries or regions and statistics based on recently dialed contacts across all contacts for a specified configurable time interval. This contact center can target the right communication device to contact the customer in the first attempt rather than using a prior approach of round-robin dialing out devices until the dialer finally connects to a communication device on which is the customer is currently available.

The present disclosure can provide a number of advantages depending on the particular aspect, embodiment, and/or configuration. For example, it can increase the productivity of the dialer and agents as calls will be routed to the device type that is more or most likely to be answered in the first dialing attempt. The dialer can do those not only nationally but also internationally through the consideration of the geographic, geopolitical, and geocultural locations of the customer. This can enable the dialer to reach a selected customer in the least number of attempts.

These and other advantages will be apparent from the disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The terms "auto dialer", "autodialer", and "autodialler" refer to an electronic device or software that automatically dials telephone numbers. Once the call has been answered, the autodialer either plays a recorded message or connects the call to a live person.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any storage and/or transmission medium that participate in providing instructions to a processor for execution. Such a medium is commonly tangible and non-transient and can take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

The term "contact" refers to any voice, text, and/or video electronic communication, such as a voice call, E-mail, instant message, text chat, VoIP call, and the like.

The term "customer" or "client" denotes a party patronizing, serviced by, or otherwise doing business with the enterprise A "database" as used herein refers to an organized set of data held in a computer. The organization schema or model for the data can, for example, be hierarchical, network, relational, entity-relationship, object, document, XML, entity-attribute-value model, star schema, object-relational, associative, multidimensional, multivalue, semantic, and other database designs.

The terms "determine", "calculate" and "compute," and variations thereof, as used herein, are used interchangeably and include any type of methodology, process, mathematical operation or technique.

The term "electronic address" refers to any contactable address, including a telephone number, instant message handle, e-mail address, Universal Resource Locator ("URL"), Universal Resource Identifier ("URI"), Address of Record ("AOR"), electronic alias in a database, like addresses, and combinations thereof.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element. Also, while the disclosure is presented in terms of exemplary embodiments, it should be appreciated that individual aspects of the disclosure can be separately claimed.

The term "natural predictive dialing" refers to a dialer that inserts agents before the automation component of the dialer (such as call progress analysis) has completed. For example, a standard predictive dialer will (1) first determine if a live person has answered the phone call and then (2) transfer that call to agent that is deemed to be available to take the call. Conversely, natural predictive dialers connect the agent prior to the completion of the automation process, which allows the agent to hear the called party say "hello" while the automation is still working. In natural predictive dialing, the call automation (sometimes called Call Progress Analysis (CPA)) can work before during or after an agent has interfaced with a call.

The term "predictive dialer" refers to a dialer that dials a list or set of telephone numbers and connects answered dials to people making calls, often referred to as agents. Predictive dialers use statistical algorithms to minimize the time that agents spend waiting between conversations, while minimizing the occurrence of someone answering when no agent is available.

"Real-Time Contacts" as used herein refer to contacts in which the contacting entity or customer is present during the waiting (or queuing) period and can choose to abandon or disconnect the contact if the call is not serviced within an acceptable period. Common examples include voice calls, VoIP, video calls, and the like.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

FIG. 3 depicts a set of data structures in accordance with embodiments of the present disclosure;

FIGS. 4A and B each depict a set of data structures in accordance with embodiments of the present disclosure;

FIG. 5 depicts a set of data structures in accordance with embodiments of the present disclosure;

FIG. 6 depicts a set of data structures in accordance with embodiments of the present disclosure;

FIG. 8 depicts a set of data structures in accordance with embodiments of the present disclosure.

DETAILED DESCRIPTION

The Contact Center

Figure 1:
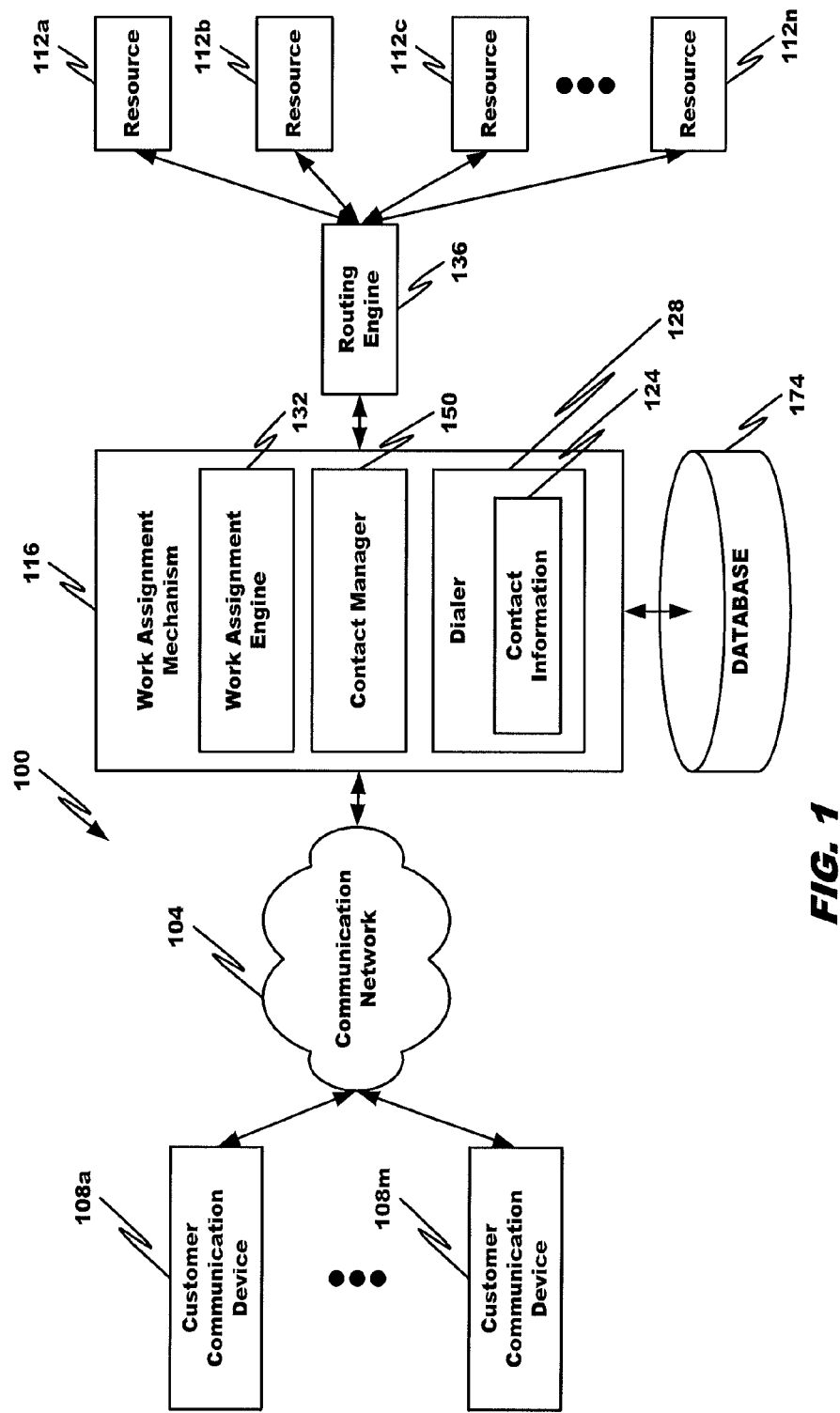
FIG. 1 is a block diagram of a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprises a communication network 104 connecting one or more communication devices 108a-m to a work assignment mechanism 116, which may be owned and operated by an enterprise administering a contact center in which a plurality of resources 112a-n are distributed to handle incoming and outgoing work items (in the form of contacts) from and to the customer communication devices 108a-m.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes and Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Voice over Internet Protocol (VoIP) network, a Session Initiation Protocol (SIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108a-m may correspond to customer communication devices. In accordance with at least some embodiments of the present disclosure, a customer may utilize their communication device 108a-m to initiate a work item, which is generally a request for a processing resource 112a-n. The contact center itself can initiate the work item with a customer communication device 112a-n by initiating an outbound contact to the device 112a-n. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), an outbound call by a dialer to the customer communication device 112a-n, and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784,369, 12/706,942, and Ser. No. 12/707,277, filed Mar. 20, 1010, Feb. 17, 2010, and Feb. 17, 2010, respectively, each of which are hereby incorporated herein by reference in their entirety.

The work assignment mechanism 116 may employ any queue-based or queueless work assignment algorithm. Examples of queue-based work assignment skill-based algorithms include, without limitation, a fairness algorithm, pacing algorithm (which inserts rests into the agents work queue), value-based algorithms, limited algorithms (such as Business Advocate™ by Avaya, Inc.), and outsourcing algorithms. Other algorithms may consider other types of data inputs and/or may treat certain data inputs differently.

The format of the work item may depend upon the capabilities of the communication device 108a-m and the format of the communication. In particular, work items are logical representations within a contact center of work to be performed in connection with servicing a communication received at the contact center (and more specifically the work assignment mechanism 116). The communication may be received and maintained at the work assignment mechanism 116, a switch or server connected to the work assignment mechanism 116, or the like until a resource 112a-n is assigned to the work item representing that communication at which point the work assignment mechanism 116 passes the work item to a routing engine 136 to connect the communication device 108a-m which initiated the communication with the assigned resource 112a-n.

Although the routing engine 136 is depicted as being separate from the work assignment mechanism 116, the routing engine 136 may be incorporated into the work assignment mechanism 116 or its functionality may be executed by the work assignment engine 132.

In accordance with at least some embodiments of the present disclosure, the communication devices 108a-m may comprise any type of known communication equipment or collection of communication equipment. Examples of a suitable communication device 108a-m include, but are not limited to, a personal computer, laptop, Personal Digital Assistant (PDA), cellular phone, smart phone, telephone, or combinations thereof. In general each communication device 108a-m may be adapted to support video, audio, text, and/or data communications with other communication devices 108a-m as well as the processing resources 112a-n. The type of medium used by the communication device 108a-m to communicate with other communication devices 108a-m or processing resources 112a-n may depend upon the communication applications available on the communication device 108a-m.

In accordance with at least some embodiments of the present disclosure, the work item is sent toward a collection of processing resources 112a-n via the combined efforts of the work assignment mechanism 116 and routing engine 136. The resources 112a-n can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112a-n may be owned and operated by a common entity in a contact center format. In some embodiments, the work assignment mechanism 116 may be administered by multiple enterprises, each of which has their own dedicated resources 112a-n connected to the work assignment mechanism 116.

Work Assignment Engine 132

In some embodiments, the work assignment mechanism 116 comprises a work assignment engine 132 which enables the work assignment mechanism 116 to make intelligent routing decisions for work items, a dialer 120 that uses contact information 124 for implementing an outbound calling strategy, such as part of a telemarketing campaign, and a contact manager 150 for managing the contact information.

In some embodiments, the work assignment engine 132 is configured to administer and make work assignment decisions in a queueless contact center, as is described in U.S. patent application Ser. No. 12/882,950, the entire contents of which are hereby incorporated herein by reference. More specifically, the work assignment engine 132 can determine which of the plurality of processing resources 112a-n is qualified and/or eligible to receive the work item and further determine which of the plurality of processing resources 112a-n is best suited (or is the optimal processing resource) to handle the processing needs of the work item. In situations of work item surplus, the work assignment engine 132 can also make the opposite determination (i.e., determine optimal assignment of a work item resource to a resource). In some embodiments, the work assignment engine 132 is configured to achieve true one-to-one matching by utilizing bitmaps/tables and other data structures.

The dialer 128 can be any type of automated or auto dialer, such as a predictive dialer and a natural predictive dialer. The dialer places outgoing, typically real-time, contacts to customer communication devices 108a-m based on contact information 124.

Figure 7:
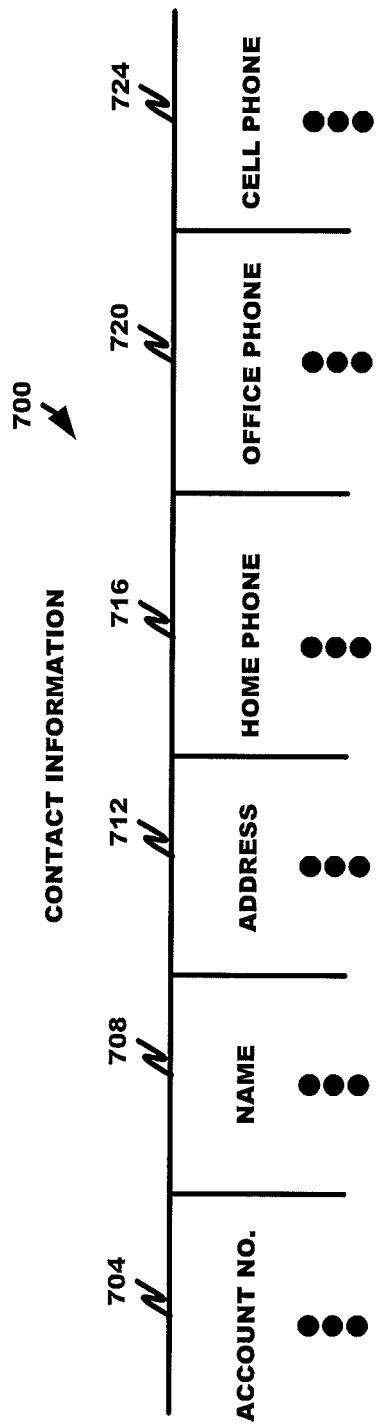
FIG. 7 depicts a set of data structures in accordance with embodiments of the present disclosure.

The contact information 124 includes various informational fields containing information for the auto dialer. An example of a set of data structures 700 for the contact information is shown in FIG. 7. The set of data structures 700 includes customer account number 704, customer name 708, customer address 712, customer home phone number 716, customer office phone number 716, and customer cellular phone number 720. The contact information can include other fields, such as pager number, another type of electronic address, such as an IP address, associated with a customer communication device 108a-m, customer ranking, rating and/or level of importance (e.g., gold, silver or bronze customer), customer business history with the operator and/or enterprise associated with the contact center, customer contact history with the contact center, customer presence information, customer personal information (such as family members, age, sex, health, and marital status), geographic, geopolitical, and/or geocultural location of the customer, and customer socioeconomic status or information. As will be appreciated other types of information may be included in the contact information and the contact information can have a data structure other than a table or list.

The contact manager 150 manages the contact information 124 and/or dialer automatically and dynamically to reflect selected factors, such as current time-of-day, day-of-week, scheduled holidays, weekend days, and work days based on one or more of the geographic, geopolitical, and geocultural location of the associated customer and/or customer communication devices 112a-m, and historic and/or currently experienced success rates for different types of devices corresponding to the customer communication devices 108a-m. "Device type" typically corresponds to one or more of home phone, office phone, mobile or cellular phone, and pager. The factors are commonly maintained in a database 174 accessible by the work assignment mechanism 116. An appropriate "device type" tag is associated by the contact manager 150 with each of a selected customer's associated customer communication devices 108a-m when populating the contact information 124 fields. Device type can be determined by known techniques, such as by using a customer's presence and availability information from a presence service, customer profiles in database 174, wireline and wireless telephone service providers, a social network profile of the customer, and the like.

The contact manager 150 can track the rate of success of contacting a customer for each communication device type and for each selected grouping of customers and/or customer communication devices 108a-m. Thus, if a customer is contacted on each of his home, work, and cell phones but only answers the contact to the cell phone, the cell phone number contact attempt is considered to be a successful instance while the work and cell phone contact attempts are each considered to be an unsuccessful instance. In other words, the "success rate" is the number of connects per total dialed numbers for each selected device type for each selected interval of time and for each selected grouping of customers and/or customer communication devices 108a-m. Success rate is determined for a selected grouping or set of customer communication devices 108a-m, such as on a region-by-region, country-by-country, city-by-city, or other selected geographic, geopolitical, and/or geocultural basis. The contact manager 150 can maintain a trend of each device type within the selected customer communication device grouping. Time intervals can also be divided in various categories, such as work day, holiday day, weekend day, and the like.

A contact center supervisor can initially set which category should be called first (such as home number) during each time window. The supervisor can then set the "auto phone prioritization" to "yes", which activates this feature. Once a considerable or selected or predetermined amount of dialing has happened (which can be configurable), the "auto phone prioritization" can be commenced or instantiated. In this mode, the contact manager 150 compares the different device types and determines which is the most successful category, which is the second most successful, and so on. The contact manager 150 can then change the set priorities of the device types within the contact information 124 automatically. This can be done by altering the contact information 124 itself, such as by flagging or tagging the device types to reflect the order of contacting by the dialer 128, or simply by altering the order in which the phone numbers for a selected customer are provided to the dialer 128. The contact manager 150 can continue monitoring the trend for each device type and for each selected grouping of customers and customer communication devices 112a-m and keep changing the priority automatically as and when it determines that it is necessary. The contact manager 150 can thereby increase significantly the connect ratio for the initial contact for a selected customer.

The database 174 typically includes various sets of data structures. With reference to FIG. 3, a first set of data structures 312, 316, and 320 includes fields for device type 304 and outbound dialer success rate 308. Separate or independent first sets of data structures can be maintained for each selected grouping of customers and/or customer communication devices 112a-m. With reference to FIGS. 4A and B, a second set of data structures 400 and 404 for country 408 and corresponding weekend1 412 and weekend 2 416, holiday1 420, holiday2 424, and so on. With reference to FIG. 5, a third set of data structures 500 includes country 408, day 504, business hour start 508, and business hour end 512. With reference to FIG. 6, a third set of data structures 600 includes country 408, device name (or type) 304, special days 604, holidays 608, weekend1 412 and weekend 2 416, weekdays business hours 612, and weekdays non-business hours 616. The third set of data structures 600 includes a corresponding weighting factor in each of the fields 604, 608, 412, 416, 612, and 616. Finally, the database 174 includes a fourth set of data structures 700 corresponding to contact information.

By managing the contact information 124 automatically and dynamically to reflect one or more selected factors, the contact manager 150 in turn enables the dialer 128 to automatically and dynamically change the contact communication device type to call, thereby enabling a higher likelihood of success on the first contact attempt.

Contact Center Operation

Figure 2A:
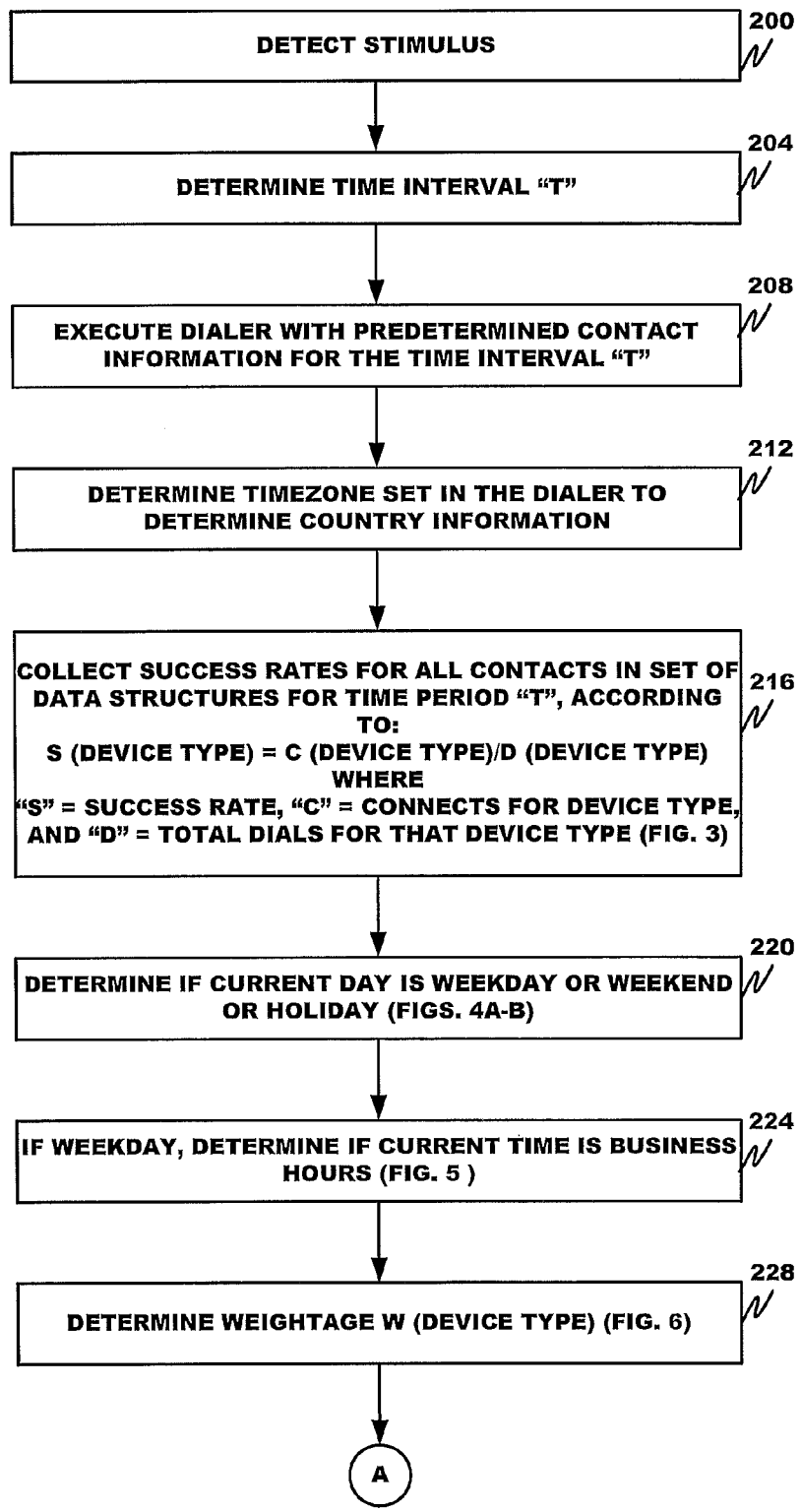
FIGS. 2A and B depict a flow diagram in accordance with embodiments of the present disclosure.
Figure 2B:
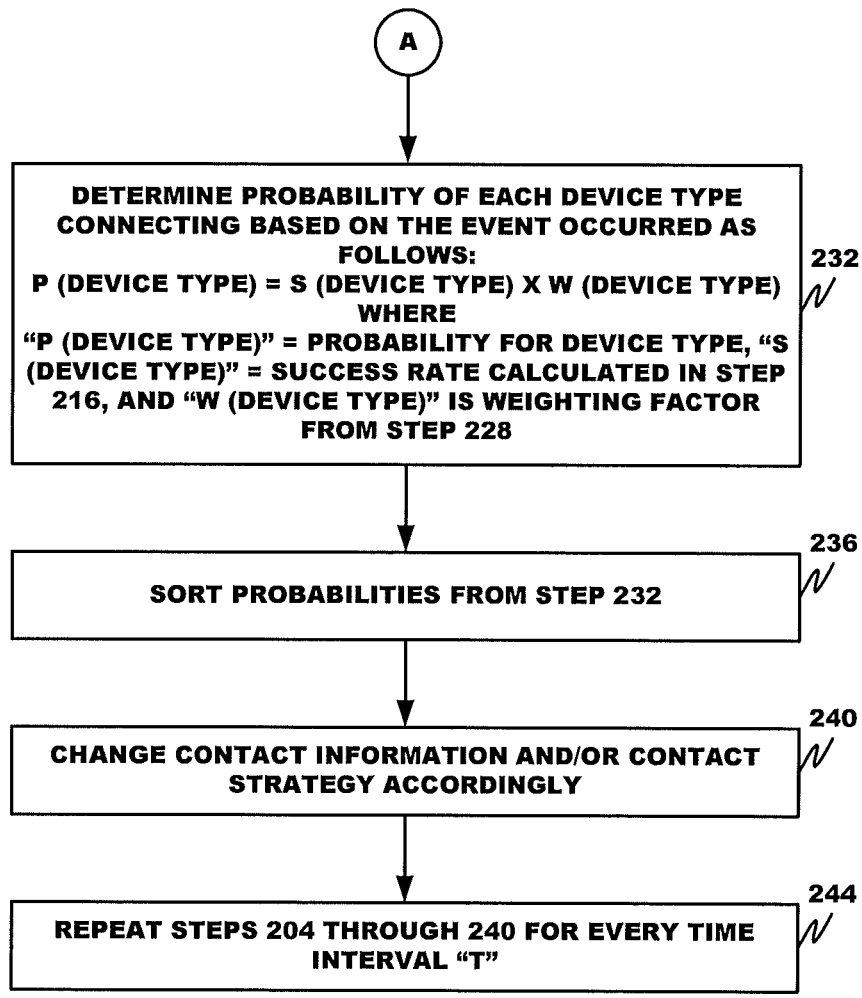

Referring to FIG. 2A, operation of the contact manager 150 will be discussed. While the steps are discussed with reference to a country-by-country application, it is to be understood that other types of grouping of customers and/or customer communication devices 108a-m may be used, such as a selected geographical, geocultural, and/or geopolitical area or region such as a country, state, city, region (such as Asia, North America, South America, Europe, and the like).

In step 200, the contact manager 150 detects a stimulus, such as receipt of an "auto phone prioritization" command from a contact center administrator.

In step 204, the contact manager 150 determines the time interval "T", which is typically preconfigured or predetermined by a contact center administrator.

In step 208, the dialer is executed with the predetermined contact information for the time interval "T".

For each outbound contact to a customer communication device 108a-m, the contact manager 150, in step 212, determines the time zone, or timezone, set in the dialer to determine country information. The country information is the country in which the electronic address to be contacted is located. Other techniques for determining country can be employed, such as using a customer profile, area code of the electronic address, customer presence information, and the like.

In step 216, the contact manager 150 collects the success rates for all contacts and populates the first set of data structures (FIG. 3) for the time interval "T". The success rate is defined by the following equation:

$$S(\text{device type}) = C(\text{device type})/D(\text{device type})$$

where "S (device type)" is the success rate for the selected device type, "C (device type)" is the number of connects for the selected device type, and "D (device")" is the total number of dials or attempts for the selected device type.

In step 220, the contact manager 150 determines if the current day is a weekday or weekend using the data structures of FIGS. 4A and 4B.

In step 224, the contact manager 150, when the current day is a business day (or a weekday that is not a holiday), determines whether the current time is within business hours using the third set of data structures (FIG. 5).

In step 228, the contact manager 150, using the fourth set of data structures (FIG. 6) a weighting factor "W (device type)" for the selected device type.

In step 232, the contact manager 150, determines the probability of each device type connecting successfully on a given contact attempt as follows:

$$P(\text{device type}) = S(\text{device type}) \times W(\text{device type})$$

where "P (device type)" is the probability of a successful connect on an outgoing contact to a communication device of the selected device type and for a selected grouping of customers and/or customer communication devices 108a-m, "S (device type)" is the success rate (determined in step 216) for the selected device type, and "W (device type)" is the weighting factor (determined in step 228). The weighting factor can be related to historic probabilities for the selected country or device time in prior time intervals, cultural factors (such as prevalence of the selected type of communication device in the selected country, relative usage rates of the various types of communication devices in the selected country, and the like.

The probability "P" is the probability of reaching a customer communication device during time interval "T" based on historical statistics collected from a sample in the time interval "T" and weighted with day and business hour variability of the geographical, geocultural and/or geopolitical region in which the selected grouping of customers and/or customer communication devices 108a-m are located.

In step 236, the contact manager 150 sorts the probabilities determined in step 232 in a suitable fashion. The sorting can, for example, be based on one or more of device type and/or the geographical, geocultural and/or geopolitical region in which the selected grouping of customers and/or customer communication devices 108a-m are located to produce a fifth set of data structures shown in FIG. 8. The fifth set of data structures 800 includes for instance the selected time interval "T" 804 (which can be identified by beginning and ending timestamps), grouping identifier 808 of the corresponding grouping of customers and/or customer communication devices 108a-m (such as in a selected geographical, geocultural, and/or geopolitical area or region such as a country, state, city, region (such as Asia, North America, South America, Europe, and the like)), device type 808, and probability 812 associated with the foregoing. In one configuration, the fifth set of data structures typically corresponds to, or is based on, data collected during a selected time interval "T". After the interval has expired, the weighted probability can be determined for use in subsequent or other time intervals. This can also be done for only a portion of the time interval with the weighted probability being determined for future contacts within the time interval.

In step 240, the contact manager 150 changes the contact information and/or contact strategy (for the next time interval) based on the (previously collected) fifth set of data structures of FIG. 8. The strategy can be changed for the selected types of communication devices in the same country or region upon which the fifth set of data structures is based. One strategy would be to first contact the highest probability device type for a selected grouping identifier, second contact the next highest probability device type for the selected grouping identifier, and so on. Other contact strategies are possible depending on the application.

As shown in box 244, steps 204 through 240 can be repeated for every time interval "T".

The exemplary systems and methods of this disclosure have been described in relation to contact or interaction centers. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a server, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

For example while the disclosure has been described primarily with reference to a queue-based contact center, it may be applied to a queueless contact center. A queueless contact center discards queues and uses pools of resources, work items and qualifier sets and creates a qualification bit map for each pool. One-to-one optimal matching of work items and resources can be achieved by determining which resources are qualified to be assigned to a selected work item, which qualified resources are eligible to be assigned to the selected work item, and which eligible resources are most suitable to be assigned to the selected work item. The bit maps can enable ultra-fast mapping to determine which of the various resources is most suitable to be assigned to the selected work item.

In another alternative embodiment, the techniques described herein are applied to a grid-based contact center where the workload is distributed across everything, as described in US Patent Application No. 2010/0296417, which is incorporated herein by this reference.

In yet another alternative embodiment, the transfer feature is implemented in a traditional fashion where the initial resource transfers the contact to another resource (e.g., supervisor or subject-matter expert). However, the fact of the transfer and identity of the new resource are kept secret from the customer.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized. In this system, the monitoring queues 216 and/or 224 would be replaced by bitmaps in the same manner as the work item and resource queues 200*a-n* and 204*a-m*.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   determining, by a microprocessor executable contact manager of a contact center, for multiple selected customers, each customer having multiple different types of customer communication devices, and for each of the multiple different types of customer communication devices, one or more of a success rate for contacting a customer at a corresponding type of customer communication device and a probability of contacting successfully the customer at the corresponding type of customer communication device; and
   selecting, by the microprocessor executable contact manager and based on one or more of the determined success rate for contacting a customer at the corresponding type of customer communication device and probability of contacting successfully the customer at the corresponding type of customer communication device, an order in which to contact customer communication devices of different device types, including the corresponding types of customer communication devices, of other customers.

2. The method of claim 1, wherein a dialer places the contacts to customer communication devices of the different device types based on the selected order, wherein the different device types correspond to a common grouping of customers and/or customer communication devices, and wherein the different device types are plural of home telephone, business telephone, cellular telephone, and pager.

3. The method of claim 2, wherein the common grouping corresponds to one or more of a geopolitical and geocultural geographical area.

4. The method of claim 1, wherein each of the different device types has a corresponding one or more of the determined success rate for contacting a customer at the selected type of customer communication device and probability of contacting successfully the customer at the selected type of customer communication device and wherein the order is based on the relative magnitudes of the one or more of the determined success rate for contacting a customer at the selected type of customer communication device and probability of contacting successfully the customer at the selected type of customer communication device.

5. A method, comprising:
  determining, by a microprocessor executable contact manager of a contact center and for a selected type of customer communication device, one or more of a success rate for contacting a customer at the selected type of customer communication device and a probability of contacting successfully the customer at the selected type of customer communication device; and
  selecting, by the microprocessor executable contact manager and based on one or more of the determined success rate for contacting a customer at the selected type of customer communication device and probability of contacting successfully the customer at the selected type of customer communication device, an order in which to contact customer communication devices of different device types including the selected type of customer communication device, wherein the success rate is defined by:
  P (device type)=S (device type)*W (device type), where P (device type) is a probability of contacting a customer at a selected customer communication device, S is the success rate for contacting the customer at the selected type of customer communication device, and W is a weighting factor for the selected device type.

6. The method of claim 5, wherein the weighting factor is a function of one or more of whether a current time corresponds to a weekend, whether the current time corresponds to a holiday, whether the current time corresponds to a business day, whether the current time corresponds to a business hour of a business day, and a grouping identifier corresponding to a grouping of customers and/or customer communication devices and associated with the selected device type and/or customer communication device.

7. A tangible and non-transitory computer readable medium comprising microprocessor executable instructions that, when executed by the microprocessor of a contact center, perform steps comprising:
  determining, for multiple customers, each customer having multiple different types of customer communication devices, and for the multiple types of customer communication devices, a likelihood of contacting successfully a customer at a respective type of customer communication device; and
  selecting, based on the likelihood and for other customers, an order and/or sequence in which to contact customer communication devices of the different customer communication device types.

8. The computer readable medium of claim 7, wherein the likelihood for a selected customer communication device type is one or more of a success rate for contacting a customer at a selected type of customer communication device and probability of contacting successfully the customer at the selected type of customer communication device, wherein a dialer places the contacts to customer communication devices of the different customer communication device types based on the selected order, wherein the different customer communication device types correspond to a common grouping of customers and/or customer communication devices, and wherein the different customer communication device types are plural of home telephone, business telephone, cellular telephone, and pager.

9. The computer readable medium of claim 8, wherein the common grouping corresponds to one or more of a geopolitical and geocultural geographical area.

10. The computer readable medium of claim 7, wherein the likelihood for a selected customer communication device type is one or more of a success rate for contacting a customer at a selected type of customer communication device and probability of contacting successfully the customer at the selected type of customer communication device and wherein the order and/or sequence is based on the relative magnitudes of the one or more of the determined success rate for contacting the selected type of customer communication device and probability of contacting successfully the selected type of customer communication device.

11. A non-transient, tangible computer readable medium comprising microprocessor executable instructions that, when executed by the microprocessor of a contact center, perform steps comprising:
  determining, for selected different types of customer communication devices, a likelihood of contacting successfully a customer at a respective type of customer communication device; and
  selecting, based on the likelihood, an order and/or sequence in which to contact customer communication devices of the different customer communication device types, wherein the likelihood for a selected customer communication device type is one or more of a success rate for contacting a customer at a selected type of customer communication device and probability of contacting successfully the customer at the selected type of customer communication device and wherein the probability is defined by:
  P (device type)=S (device type)*W (device type), where P (device type) is a probability of contacting a customer at a selected customer communication device, S is the success rate for contacting the selected type of customer communication device, and W is a weighting factor for the selected device type.

12. The computer readable medium of claim 11, wherein the weighting factor is a function of one or more of whether a current time corresponds to a weekend, whether the current time corresponds to a holiday, whether the current time corresponds to a business day, whether the current time corresponds to a business hour of a business day, and a grouping identifier corresponding to a grouping of customers and/or customer communication devices and associated with the selected device type and/or customer communication device.

13. A contact center, comprising:
a microprocessor executable contact manager operable to:
determine, for multiple customers, each customer having multiple different types of customer communication devices, and for the multiple types of customer communication devices, a likelihood of contacting successfully a customer at a respective selected type of customer communication device; and
select, based on the likelihood and for other customers, an order and/or sequence in which to contact customer communication devices of the different customer communication device types.

14. The system of claim 13, wherein the likelihood for a selected customer communication device type is one or more of a success rate for contacting a customer at a selected type of customer communication device and probability of contacting successfully the customer at the selected type of customer communication device, wherein a dialer places the contacts to customer communication devices of the different customer communication device types based on the selected order, wherein the different customer communication device types correspond to a common grouping of customers and/or customer communication devices, and wherein the different customer communication device types are plural of home telephone, business telephone, cellular telephone, and pager.

15. The system of claim 14, wherein the common grouping corresponds to one or more of a geopolitical and geocultural geographical area.

16. The system of claim 14, wherein the likelihood for a selected customer communication device type is one or more of a success rate for contacting a customer at a selected type of customer communication device and probability of contacting successfully the customer at the selected type of customer communication device and wherein the order and/or sequence is based on the relative magnitudes of the one or more of the determined success rate for contacting the selected type of customer communication device and probability of contacting successfully the selected type of customer communication device.

17. A contact center, comprising:
a microprocessor executable contact manager operable to:
determine, for selected different types of customer communication devices, a likelihood of contacting successfully a customer at a respective type of customer communication device; and
select, based on the likelihood, an order and/or sequence in which to contact customer communication devices of the different customer communication device types, wherein the likelihood for a selected customer communication device type is one or more of a success rate for contacting a customer at a selected type of customer communication device and probability of contacting successfully the customer at the selected type of customer communication device and wherein the probability is defined by:
P (device type)=S (device type)*W (device type), where P (device type) is a probability of contacting a customer at a selected customer communication device, S is the success rate for contacting the selected type of customer communication device, and W is a weighting factor for the selected device type.

18. The system of claim 17, wherein the weighting factor is a function of one or more of whether a current time corresponds to a weekend, whether the current time corresponds to a holiday, whether the current time corresponds to a business day, whether the current time corresponds to a business hour of a business day, and a grouping identifier corresponding to a grouping of customers and/or customer communication devices and associated with the selected device type and/or customer communication device.

19. A method, comprising:
determining, by a microprocessor executable contact manager of a contact center and for a selected type of customer communication device, one or more of a success rate for contacting a customer at the selected type of customer communication device and a probability of contacting successfully the customer at the selected type of customer communication device; and
selecting, by the microprocessor executable contact manager and based on one or more of the determined success rate for contacting a customer at the selected type of customer communication device and probability of contacting successfully the customer at the selected type of customer communication device, an order in which to contact customer communication devices of different device types including the selected type of customer communication device, wherein the success rate is defined by:
S (device type)=C (device type)/D (device type), where S is the success rate for a selected device type, C is a number of successful connects for the selected device type, and D is a total number of attempted connects for the selected device type.

20. A non-transient, tangible computer readable medium comprising microprocessor executable instructions that, when executed by the microprocessor of a contact center, perform steps comprising:
determining, for selected different types of customer communication devices, a likelihood of contacting successfully a customer at a respective type of customer communication device; and
selecting, based on the likelihood, an order and/or sequence in which to contact customer communication devices of the different customer communication device types, wherein the likelihood for a selected customer communication device type is one or more of a success rate for contacting a customer at a selected type of customer communication device and probability of contacting successfully the customer at the selected type of customer communication device and wherein the success rate is defined by:
S (device type)=C (device type)/D (device type), where S is the success rate for a selected device type, C is a number of successful connects for the selected device type, and D is a total number of attempted connects for the selected device type.

21. A contact center, comprising:
a microprocessor executable contact manager operable to:
determine, for selected different types of customer communication devices, a likelihood of contacting successfully a customer at a respective type of customer communication device; and
select, based on the likelihood, an order and/or sequence in which to contact customer communication devices of the different customer communication device types, wherein the likelihood for a selected customer communication device type is one or more of a success rate for contacting a customer at a selected type of customer communication device and probability of contacting successfully the customer at the selected type of customer communication device and wherein the success rate is defined by:

$S(\text{device type}) = C(\text{device type})/D(\text{device type})$, where S is the success rate for a selected device type, C is a number of successful connects for the selected device type, and D is a total number of attempted connects for the selected device type.

\* \* \* \* \*